Patented Jan. 1, 1952

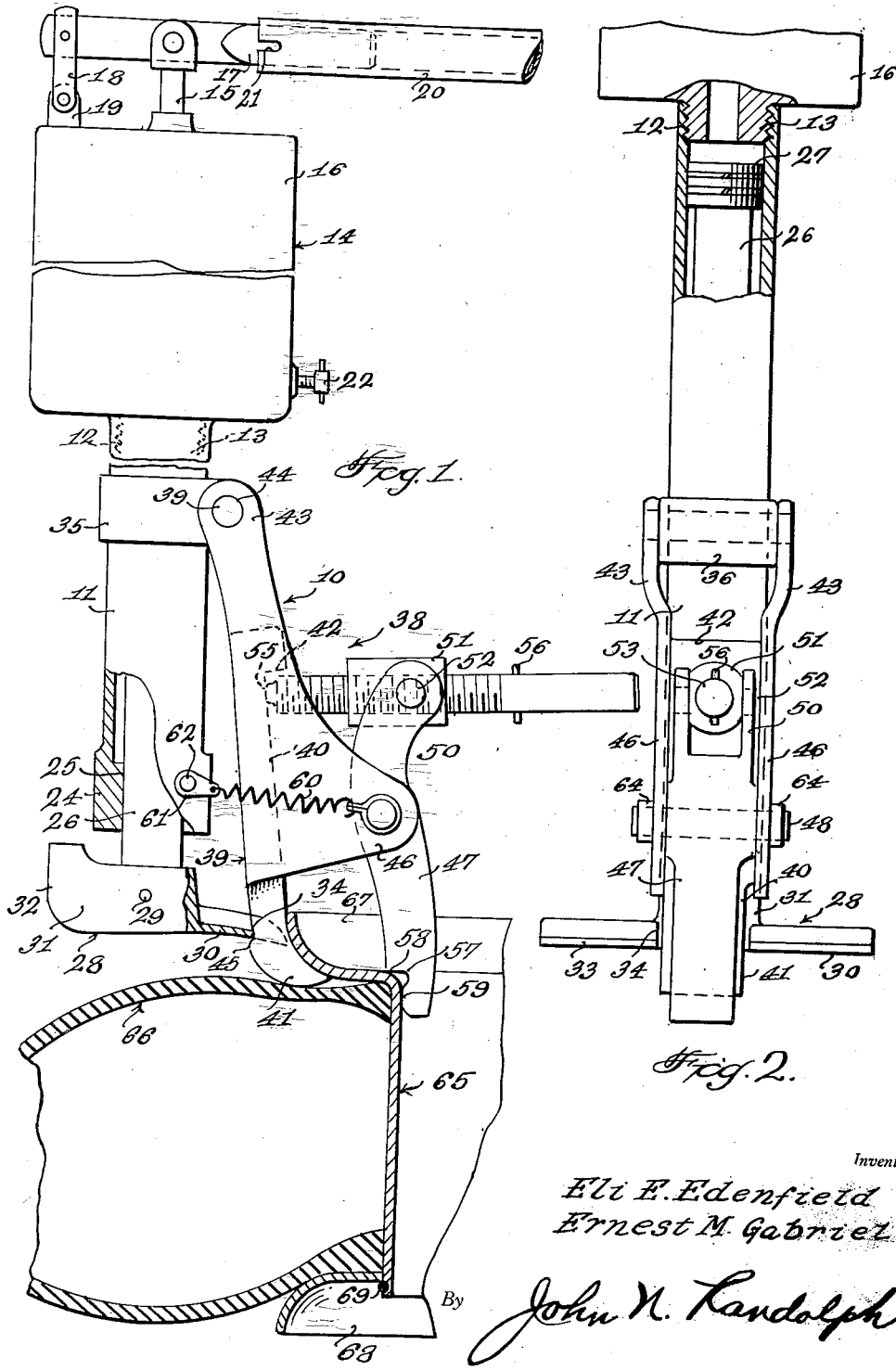

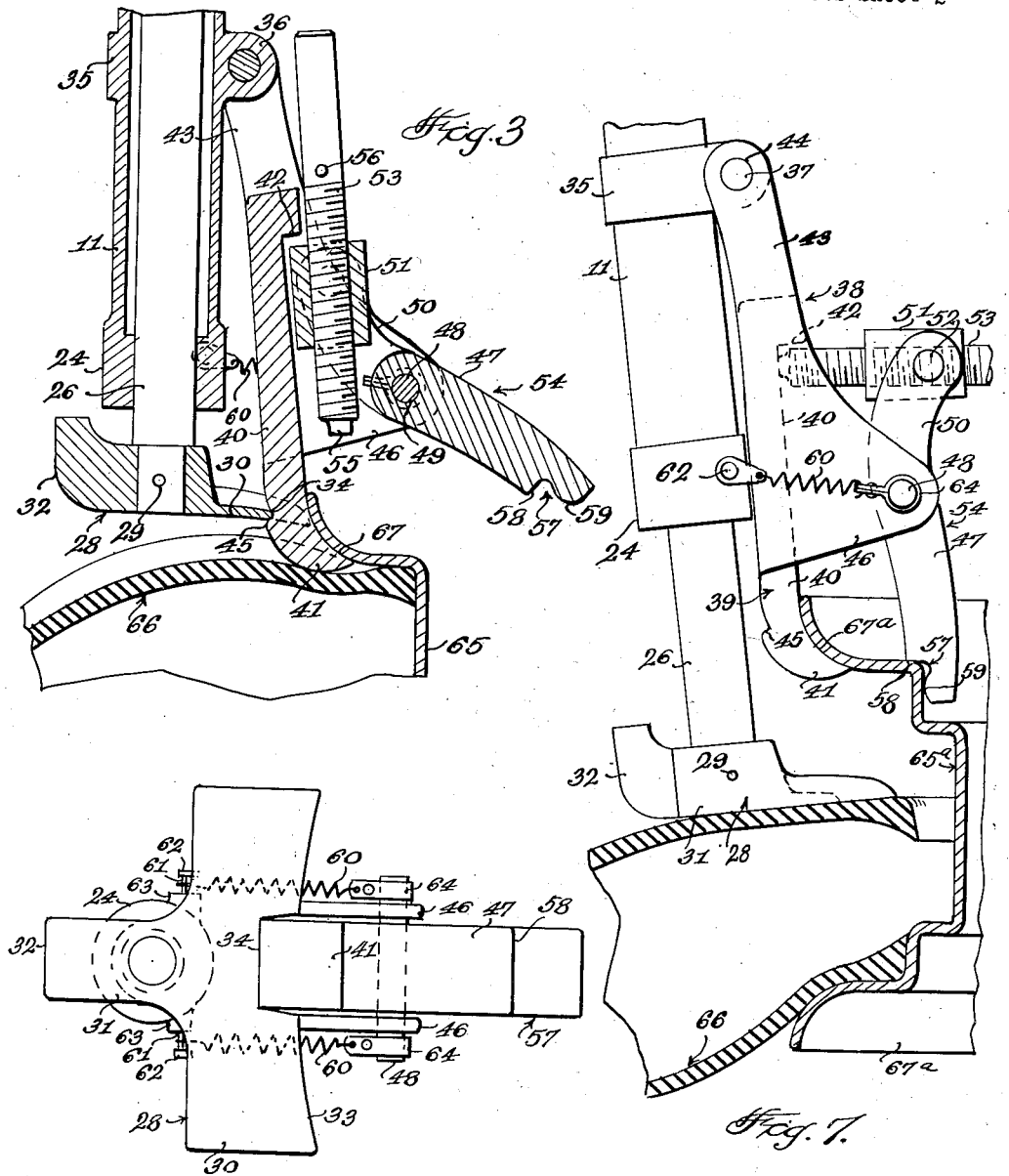

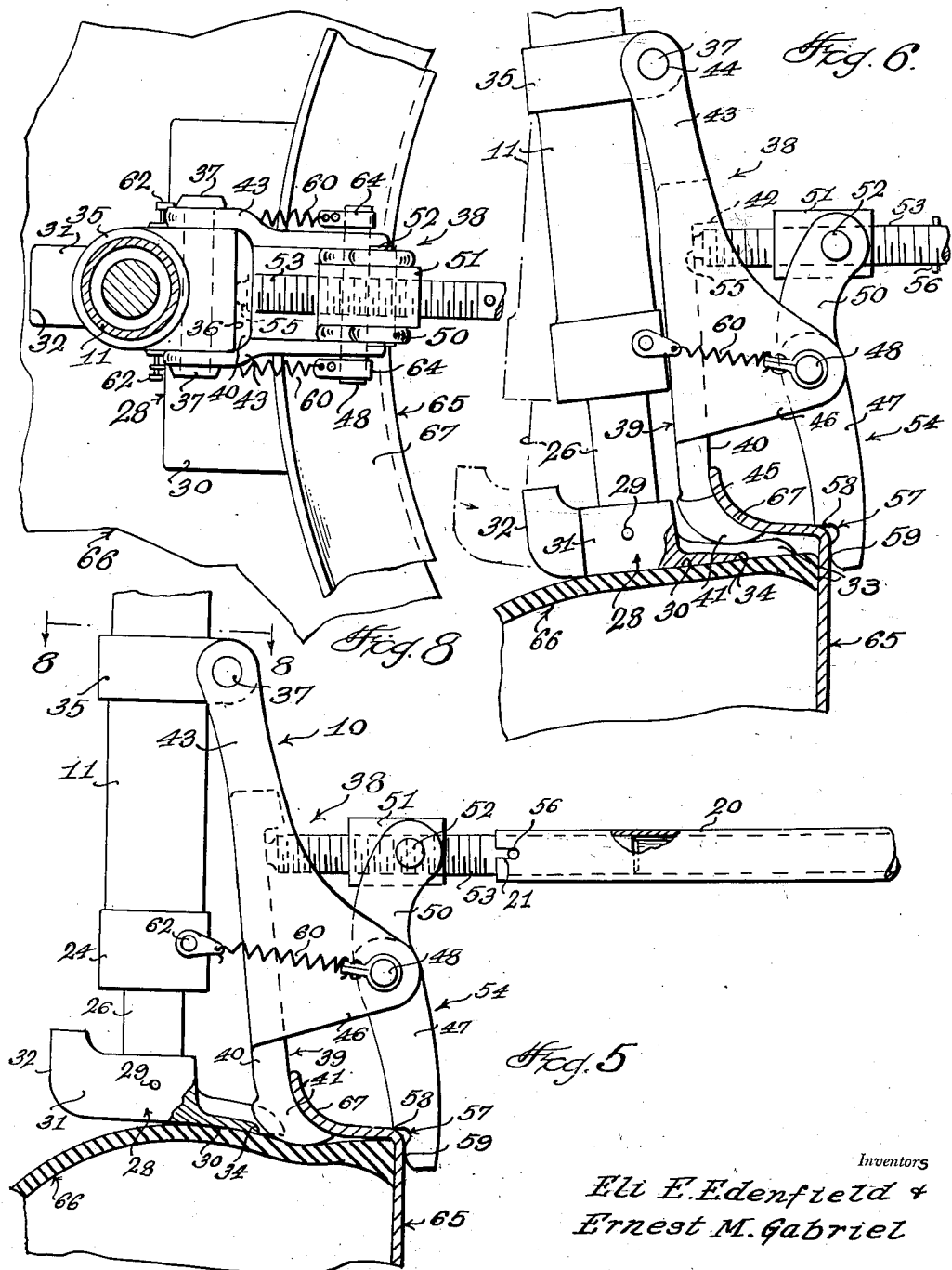

2,581,086

UNITED STATES PATENT OFFICE 2,581,086

PIVOTALLY SUPPORTED TIRE BEAD FORCING DEVICE

Eli E. Edenfield, Lakeland, and Ernest M. Gabriel, Jacksonville Beach, Fla.

Application September 7, 1948, Serial No. 48,076

5 Claims. (Cl. 157—1.17)

1

This invention relates to a novel machine or implement of extremely simple construction and which readily adapts itself for use with a minimum of manual effort and labor to the removing of pneumatic tires from tire rims of the continuous type which are ordinarily constructed as part of a vehicle wheel and which constitutes an improvement over our prior co-pending application entitled "Pneumatic Tire Removing Tool" filed December 19, 1947 and bearing Serial No. 792,662.

The present invention, like our prior application, provides a machine or implement especially intended for removing tires such as are employed on large trucks and which can not be feasibly removed with conventional tire tools but is also applicable for use on other types of vehicle tires including those employed with drop-center rims.

In addition to the objects and advantages set forth in our prior application, the present invention has for a primary object to provide an even simpler tire remover which can be applied to and removed from a rim with a minimum of manual labor and loss of time by the provision of a novel clamp structure which may be readily engaged with a fixed flange of a tire rim for detachably securing the machine thereto and so that a movable element thereof may thereafter be readily projected for forcing the tire off of the side of the rim remote to the flange engaged by the clamp.

Still another object of the present invention is to provide a clamp having a relatively narrow claw which may be readily driven into a position between the side wall of a tire and stationary rim flange for clamping the machine thereto and so that a relatively wide foot or presser member may thereafter be projected against said side wall of the tire for forcing it away from the aforementioned flange.

Still another object of the invention is to provide a novel machine wherein the foot or presser member is swingably supported relatively to the rim engaging clamp to enable it to be swung inwardly toward the bed of the rim after being partially projected for breaking the tire bead away from the rim flange and so that the tire wall may be forced in substantially a straight line toward the other side wall of the tire.

Still a further object of the invention is to provide a clamp having a novel engaging and releasing means to permit the clamp to be initially adjusted to fit a rim of a particular size and so that the clamp may thereafter be engaged and released without further adjustment as the machine is applied to different points about the circumference of the rim and tire to effect a considerable saving in time and labor in applying and removing the machine.

Various other objects and advantages of the invention will hereinafter become more fully apparent from the following description of the drawings, illustrating a preferred embodiment thereof, and wherein:

Figure 1 is a side elevational view, partly broken away and partly in section showing the machine in its initial applied position on a pneumatic tire rim;

Figure 2 is a view of the machine detached from the rim looking from right to left of Figure 1;

Figure 3 is a fragmentary substantially central vertical sectional view of the machine showing the clamp thereof in a partially applied position;

Figure 4 is a bottom plan view of the machine detached from the rim and with the parts in the positions as shown in Figure 3;

Figure 5 is a fragmentary side elevational view showing the presser element in a partially projected position;

Figure 6 is a view similar to Figure 5 and illustrating the next advanced position of the presser element;

Figure 7 is a view similar to Figures 5 and 6 illustrating a further advanced position of the machine and wherein the rim is illustrated as of the drop-center type, and Figure 8 is a horizontal sectional view taken substantially along a plane as indicated by the line 8—8 of Figure 5.

Referring more specifically to the drawings, the tire removing machine in its entirety is designated generally 10 and includes an elongated tube or cylinder 11 the upper end of which is open and internally threaded as seen at 12 to receive the externally threaded neck 13 of a conventional, manually actuated hydraulic pump 14 the piston rod 15 of which extends reciprocally through a boss on the upper end of the pump cylinder 16 and which is pivotally connected to an intermediate portion of an actuating lever 17 which is fulcrumed at one of its ends by a link 18 which is pivotally connected thereto and to an upstanding extension 19 and the cylinder 16. The pump lever 17 is adapted to be manually oscillated in a conventional manner and to afford additional leverage, a tubular handle 20 is provided, one end of which is adapted to detachably engage over the outer end of the lever 17. Said end of the handle 20 is provided with diametrically opposed outwardly opening notches 21 for a purpose hereinafter to be described. The hydraulic pump 14 is provided with the usual manually controlled release valve 22 to permit the hydraulic fluid to return to the cylinder 16, when opened. The parts 13 to 22, inclusive, constitute no part of the present invention and have been illustrated and described merely for the purpose of illustrating one means of actuating the machine 10 and as the description proceeds it will be readily apparent that the machine can be actuated by other means such as illustrated in our prior application.

The tube or cylinder 11 is provided with an externally and internally thickened lower end 24 forming a restricted bore 25 for guiding a piston rod 26 which extends reciprocally therethrough and which is provided on its upper end with a piston 27 having the usual sealing rings and against the upper end of which the pressure of the hydraulic medium, not shown, is exerted when the pump 14 is actuated for projecting said piston and the rod 26 downwardly. The internal part of the thickened portion 24 forms a stop for engagement with the lower end of the piston 27 to limit its downward movement toward a projected position and it will be readily apparent that with the valve 24a in an open position that the piston rod and piston can be forced inwardly or upwardly of the cylinder 11 for forcing the hydraulic medium back into the pump cylinder 16.

A presser element or foot 28 is secured to the lower, outer end of the piston rod 26 in any suitable manner as by means of a pin 29. The presser element 28 is disposed in a plane transversely to the axis of the piston rod 26 and includes a relatively long plate portion 30 having a shank portion 31 projecting transversely from one longitudinal edge thereof and in which the end of the rod 26 is secured. The shank portion 31 is thickened in a direction perpendicular to the plane of the plate 30 and is provided with an enlarged outer end 32 forming an impact receiving surface, for a purpose which will hereinafter be described. The opposite, outer edge of the presser plate or foot 30 is longitudinally curved and inwardly bowed as seen at 33 in Figure 4 and generally conforms to the curvature of a tire rim and is provided intermediate of its ends with a recess or notch 34.

The cylinder 11 at a point above the enlargement 24 is provided with an externally thickened integral portion 35 having on one side thereof a projection 36 which is provided at its ends with trunnions 37.

A rim clamp, designated generally 38 includes a section 39 comprising an elongated bar 40 one end of which is curved and tapered to form a claw 41 and the opposite end of which is turned laterally in the same direction as the claw 41 to form a stop 42. From said last mentioned end of the bar 40 extends a pair of ears 43 which are disposed substantially parallel and which project from the side edges of the bar 40. The ears 43 are provided with openings 44 at their free ends for turnably engaging the trunnions 37 for swingably supporting the clamp 38 on the cylinder 11 and as clearly illustrated in the drawings, said clamp normally depends downwardly with respect to said cylinder and to beyond the lower end thereof. The claw 41 on its outer side is recessed to provide an upwardly facing rounded shoulder 45. The recessed portion of the claw 41 is adapted to be initially disposed in the notch 34 of the presser plate 30 and with the inner portion of said notch resting on the shoulder 45, as best illustrated in Figure 3. The ears 43 may be formed integral with the bar 40 in which case one of said ears is bent inwardly to engage its trunnion 37 after the other ear has been placed in engagement therewith or one of the ears 43 may be welded to the bar 40 after the ears have been engaged with the trunnions.

The bar 40 is provided with flanges 46 which project therefrom in a direction away from the cylinder 11 and which are disposed substantially parallel and may constitute integral lower continuations of the ears 43. A lever 47 has its intermediate portion disposed between the outer extremities of the flanges 46 and is connected thereto by a pin 48 which extends through an opening 49 of the lever 47 and through the outer portions of the flanges 46 for swingably mounting said lever 47 on the clamp section 38. The lever 47 is provided with a bifurcated upper end 50 to accommodate an internally threaded sleeve 51 having trunnions 52 for engaging aligned openings in the upper ends of the furcations for swingably supporting said sleeve 51 on the lever 47. A screw 53 extends threadedly through the sleeve 51 and with said sleeve and lever 47 form the other section of the clamp and which is designated generally 54. The screw 53 is provided with a restricted rounded end 55 for sliding engagement with the inner surface of the bar 40 and spaced from its opposite end, said screw is provided with oppositely projecting pins 56. Said last mentioned end of the screw 53 is engaged by the end of the handle 20, provided with the notches 21 which engage the pins 56 so that the handle 20 will function for turning the screw 53 in the sleeve 51 or for swinging the screw and sleeve relatively to the lever 47, as will hereinafter become apparent.

The opposite end of the lever 47 is provided on its inner side with a notch 57 forming a shoulder or stop 58 which is adapted to bear on an internal portion of the flange of a tire rim and which notch 57 also forms a surface 59 which is disposed substantially at a right angle to the stop 58 which is adapted to bear on a portion of the inner side of the bed of a tire rim, as clearly illustrated in Figures 5, 6 and 7.

The clamp 38 is urged toward the lower end of the cylinder 11 by a pair of contractile springs 60 having at corresponding ends thereof links 61 which engage shank portions of headed pins 62 which extend into projections 63 on the enlargement 24, as best illustrated in Figure 4. The ends of the pin 48 project outwardly from the flanges 46 and are each engaged by a loop 64, which loops are each fastened to the opposite end of one of the springs 60 and it will be readily apparent that the springs 60 will normally retain the notch 34 in engagement on the rounded shoulder 45 of the claw 41 until the piston 27 and piston rod 26 are projected outwardly.

For the purpose of illustrating one preferred application and use of the machine 10, in Figures 1, 3, 5, 6 and 8 a portion of a conventional type continuous truck tire rim is illustrated at 65 and which is shown provided with a conventional tire 66, the inner tube of which has been omitted. The rim 65 is provided with the usual rigid flange 67 at one side edge thereof and its opposite side edge is provided with a removable flange 68 which is held in an applied position by a split spring ring 69 in a conventional manner.

To employ the machine 10 for removing the tire 66 from the rim 65, the split ring 69 is initially removed so that the removable flange 68 can be detached or will readily slide off of the rim with the tire 66. With the presser element 28 engaging on the shoulder 45, as illustrated in Figure 3 and with the lever 47 in a retracted position, the claw 41 which is relatively narrow, as seen in Figure 4, is inserted between the flange 67 and the adjacent side wall of the tire 66 after which the impact surface 32 is struck with an impact tool, such as a hammer, not shown, for driving the claw 41 into the position as seen in Figure 3 and which can be readily accomplished due to the fact that the claw 41 is relatively narrow and is therefore required to break only a small part of the tire wall away from the flange 67. The side of the rim 65 engaged by the tire 66 will be described as the outer side thereof. Accordingly, after the claw 41 has assumed its position of Figure 3 the screw 53 which is engaged by the handle 20, as previously described, is swung in a clockwise direction from its position of Figure 3 to its position of Figure 1 and in so moving the end 55 of the screw 53 will ride up the inner surface of the bar 40 for rocking the lever 54 likewise in a clockwise direction. Just before the end 55 reaches the stop 42 the screw 53 will pass a position in which it will be disposed perpendicular to said inner surface of the bar 40 so that when the end 55 is disposed against the stop 42 a positive force will be required to rock the screw 53 counterclockwise to cause it to slide downwardly on the bar 40. The screw 53 is tightened so that it will hold the lever 47 in the position of Figure 1 and with the shoulder 58 engaging a portion of the inner side of the flange 67 and with the surface 59 engaging a portion of the inner side of the bed of the rim 65. The notch 57 is made sufficiently deep to fit the aforementioned portions of rims of different shapes and in the manner as illustrated in the drawings. With the lever 47 thus disposed as illustrated in Figure 1, it will be readily apparent that the clamp 38 is anchored to the rim flange 67 for supporting the machine 10 thereon and the screw 53 when properly adjusted may be swung counterclockwise from its position of Figure 1 back to its position of Figure 3 for releasing the clamp and so that the machine may be quickly and easily engaged with another portion of the rim flange 67 without readjusting the screw 53.

After the machine 10 has been clamped to the rim flange as illustrated in Figure 1, the handle 20 is employed for operating the pump 14 so that the fluid therefrom will be forced into the upper end of the cylinder 11 for projecting the piston 27 and piston rod 26. Upon the initial downward movement of the piston rod 26, the inner portion of the notch 34 will ride downwardly and outwardly over the shoulder 45 after which the underside of the presser plate 39 will move into engagement with the side wall of the tire 66, engaged by said flange 67, as illustrated in Figure 5. After the presser member 28 has been advanced slightly beyond its position of Figure 5 so that it has forced a substantial portion of the tire side wall away from the flange 67, the surface 32 is again struck with a hammer or other impact tool to drive the presser element 28 inwardly of the rim 65 and into its position of Figure 6, in which position it will be retained by the springs 60. The hydraulic pump 14 is again actuated to move the presser element 28 from its position of Figure 6 in a downward direction until it has forced the portion of the tire 66 engaged thereby off of the rim 65 or substantially off of said rim. The clamp 38 is then released, as previously described and the machine removed from the rim 65 after which the valve 24a is opened so that the presser element 28 can be returned to its position of Figure 3 after which the clamp is applied, as previously described, to another portion of the flange 67 and the operation repeated. This operation is performed at a sufficient number of circumferentially spaced points around the rim 65 for breaking the tire 66 loose from the rim and for removing the tire frm said rim. Actually, as the tire and rim are laid on the ground or other supporting surface usually for removing the tire, in reality the machine 10 functions to withdraw the rim 65 upwardly and out of engagement with the tire since the tire is resting on a supporting surface.

The machine 10 is also adapted for use in the same manner for breaking the tire walls away from the flanges 67a of a drop-center type rim 65a as illustrated in Figure 7 and which is provided at both sides thereof with stationary flanges 67a. When employed in the same manner for this purpose, as the bead of the side wall which is engaged by the presser element 28 moves into the drop-center portion of the rim it will have a tendency to move inwardly into said recessed intermediate portion of the rim thereby tending to break other portions of the side wall away from the rim flange 67a which is engaged by the clamp 38. This operation may be repeated several times around each flange 67a until both side walls of the tire 66 have been disengaged from all portions of the flange 67a after which the tire 66 can be readily removed with conventional tire tools from the rim 65a and with much less difficulty than is ordinarily required.

Obviously, the piston 27 could be dispensed with and in lieu of the hydraulic pump 14 any suitable mechanical pushing means could be utilized such as a pawl and ratchet type jack as illustrated in our co-pending application or pneumatic or other means could be utilized with the piston 27 as it is immaterial to the invention involved how the rod 26 is projected from the cylinder or guide tube 11.

Various modifications and changes are contemplated and may obviously be resorted to, without departing from the spirit or scope of the invention as hereinafter defined by the appended claims.

We claim as our invention:

1. A machine for forcibly removing a pneumatic tire from its rim comprising a tubular guide, a rod reciprocally disposed therein, a presser element fixed to one end of said rod and disposed beyond an end of the tubular guide, a clamp swingably supported on said tubular guide for movement toward and away from the presser element, said clamp having a claw adapted to be inserted between a side wall of a tire and a stationary flange of the tire rim, and a swingably mounted rim engaging element forming a part of said clamp and provided with a notched portion for engagement with the opposite, inner side of said rim flange and the inner surface of the rim bed for holding the claw in an applied position, and means for projecting said rod relatively to the tubular guide for causing said presser element to initially ride over a portion of the outer side of said claw and into engagement with the side wall of the tire engaged by said flange, said tubular guide being swingable inwardly of the clamp for moving said presser element inwardly and toward the rim and beyond said claw, and said presser element being movable with said rod when advanced toward a projected position, relatively to the tubular guide, for forcing the tire off of the side of the rim remote to the flange engaged by said clamp.

2. A tire removing machine as in claim 1, said claw having a rounded shoulder on its outer side over which an edge of said presser element is movable when advanced toward a projected position, and spring means for urging the tubular guide toward the clamp.

3. A machine as in claim 1, and cam means for swinging said movable clamp element toward an operative, rim engaging position and for retaining said element releasably in an operative position.

4. A machine for forcibly removing a tire from its rim comprising a rim flange engaging clamp having a claw adapted to engage between a rim flange and the adjacent side wall of a tire, a swingably mounted element forming a part of said clamp having an outer end adapted to engage the opposite, inner side of the rim flange and rim bed, adjustable cam means for rocking said swingable clamp element toward an operative position and for retaining said aforementioned end thereof in engagement with the rim, a guide tube swingably connected to an end of the clamp remote to said claw, a rod reciprocally disposed in said guide tube and having one end projecting from an end thereof and disposed adjacent the claw, a foot member mounted on said end of the rod for engaging the side wall of the tire engaged by said flange when the rod is projected outwardly of the guide tube, means for projecting said rod relatively to the guide tube, and said foot member being disposed to ride over a portion of said claw and being displaceable inwardly and toward the rim when disposed therebeyond by swinging said guide tube in one direction on the clamp.

5. A tire removing machine as in claim 4, said cam means including an internally threaded sleeve swingably supported on the opposite inner end of said swinging clamp element, a screw extending adjustably through said sleeve and having one end engaging a surface of the clamp when said sleeve is rocked in one direction for causing said swingable clamp element to be swung toward an operative position.

ELI E. EDENFIELD.
ERNEST M. GABRIEL.

REFERENCES CITED

The following references are of record in the file of this patent:

UNITED STATES PATENTS

| Number | Name | Date |
|---|---|---|
| 1,059,128 | Edwards | Apr. 15, 1913 |
| 1,475,519 | Snider | Nov. 27, 1923 |
| 1,506,654 | Michelin | Aug. 26, 1924 |
| 1,858,098 | Linde | May 10, 1932 |